United States Patent Office 3,795,583
Patented Mar. 5, 1974

3,795,583
PROCESS FOR PREPARING L-SERINE
Kiyoshi Nakayama, Sagamihara, and Hiroshi Kase and
Hajime Yoshida, Tokyo, Japan, assignors to Kyowa
Hakko Kogyo Kabushiki Kaisha, Tokyo-to, Japan
No Drawing. Continuation-in-part of abandoned application Ser. No. 134,626, Apr. 16, 1971. This application Nov. 6, 1972, Ser. No. 303,937
Claims priority, application Japan, Apr. 17, 1970,
45/32,359
Int. Cl. C12d 1/00
U.S. Cl. 195—29
14 Claims

ABSTRACT OF THE DISCLOSURE

The present invention relates to a process for preparing L-serine by fermentation using a microorganism, wherein said fermentation employs a medium which contains at least one compound selected from the group consisting of L-threonine and L-homoserine so as to accumulate a substantial amount of L-serine in the medium, which is thereafter recovered.

RELATED APPLICATION

The present application is a continuation-in-part of Ser. No. 134,626 filed Apr. 16, 1971, in the name of the present inventors.

SUMMARY OF INVENTION

According to the present invention, it is possible to produce L-serine economically on an industrial scale. A process for preparing L-serine by fermentation has recently been disclosed in U.K. Patent. No. 1,207,096 filed on behalf of the present inventors and corresponding to original Japanese patent application No. 25,529/1968. The disclosure of U.K. No. 1,207,096 is hereby incorporated by reference. It has now been discovered that the amount of L-serine accumulated in a culture medium by the aforesaid process can unexpectedly be increased by carrying out the cultivation with addition of at least one compound selected from the group consisting of L-threonine and L-homoserine to the medium, the concentration of the said compounds being more than 1 mg./ml. Concentrations of 1 mg./ml. to 100 mg./ml., preferably 4 mg./ml. to 50 mg./ml. are employed.

Microorganisms which may be used for the present invention include any of L-serine-producing microorganisms, with the amount of L-serine produced significantly increased by using the above mentioned compounds. The microorganism described below is on deposit at the American Type Culture Collection and freely available to the public.

As described in U.K. Pat. No. 1,207,096, L-serine may be produced with bacteria belonging to the genus Arthrobacter, the genus Brevibacterium or the genus Corynebacterium. Isoleucine-requiring mutant strains are found to be especially excellent in attaining the objectives of the invention.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source and inorganic compounds which are utilized by the microorganism employed in appropriate amounts. Thus, as a carbon source, there may be mentioned, by way of example, carbohydrates such as glucose, fructose, maltose, sucrose, starch, starch hydrolysate, molasses, mannose, glycerol, sorbitol or mannitol, or any other suitable carbon source such as sugar alcohols, organic acids, for example, acetic acid, lactic acid, pyruvic acid, fumaric acid, or amino acids such as aspartic acid or glutamic acid. In the case of using hydrocarbon-assimilating microorganisms, hydrocarbons, for example, n-paraffins, kerosene or petroleum fractions including light oils, heavy oils, paraffin oils and the like may be used in the nutrient medium as the source of carbon, or in combination with one or more than one of the carbon sources mentioned hereinabove. Either a single source of carbon or mixture of two or more may be employed.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate and ammonium carbonate, or natural substances containing nitrogen, such as cornsteep liquor, yeast extract, meat extract, peptone, fish meal, or various digestion substances thereof bouillon, casein hydrolysates, fish soluble, rice bran extract, defated soybean dregs or digestion substances thereof or chrysalis hydrolysates may be employed. Again, these substances may be used either singly or in combination of two or more.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate and calcium carbonate.

If the microorganism employed requires other nutrients for its growth, adequate amounts of the nutrients needed to satisfy the particular requirement should, of course, be added to the culture medium. These nutrients are sometimes contained in the natural substances added to the medium as the source of nitrogen and need not to be added in addition thereto. If desired, however, these substances may be added to the medium as such and include growth factors such as, for example, amino acids, vitamins such as thiamine, cobalamin, or biotin.

In accordance with the present invention, more than 1 mg./ml. of the member of the group consisting of L-threonine and L-homoserine are further added to the culture medium to improve yields.

Culturing is conducted under aerobic conditions, such as aerobic shaking of the culture or with aeration and agitation of a submerged culture, at a temperature of, for example, 20° C. to 40° C. and at a pH of, for example, 4.0 to 9.5. It is to be understood that the temperature and the pH may be varied, even outside the described limits, in accordance with the growth requirements of the particular microorganism utilized. In order to obtain high yields of L-serine, it is desirable to maintain the pH of the culture medium at approximately neutral (7.0) during culturing. After 1 to 5 days of culturing under these conditions, significant amounts of L-serine are produced and accumulated in the resultant culture liquor.

After the completion of culturing, the microorganism cells and undersirable precipitates are removed from the culture liquor and the L-serine is recovered from the liquor by conventional means, such as an ion exchange resin treatment extraction with solvents, precipitation, adsorption, chromatography or concentration. An especially suitable method for recovery is the ion exchange resin treatment.

The following non-limitative examples illustrate the invention. The strains are freely available to the public from the American Type Culture Collection. The L-serine was recovered from the culture medium in each case in such a manner that after removal of bacterial cells from the broth by filtration, the filtrate is passed through a strongly acidic ion exchange resin to adsorb L-serine, and the L-serine is eluted by aqueous ammonia and the eluate is concentrated to crystallize crude L-serine. The crude crystalline L-serine may be recrystallized, if necessary, to give purified crystalline L-serine.

EXAMPLE 1

L-serine producing strain ATCC 21218 (isoleucine and methionine requiring) which belongs to *Arthrobacter paraffineus* was used as seed.

The seed strain was inoculated to 20 ml. of a sterilized culture medium (pH: 7.4) in a 250 ml. Erlenmeyer flask. The medium was composed of 2% sorbitol, 1% of beef extract, 1% of peptone, 0.5% of yeast extract and 0.3% of NaCl. The seed was cultured at 30° C. for 24 hours with shaking, and the resultant seed culture (1 ml.) was then inoculated into 10 ml. of a sterilized fermentation medium in a large test tube. The seed was then further cultured at 30° C. for 96 hours with shaking.

As the fermentation medium, a medium (pH: 7.4) having a composition of 10% of n-alkane mixture ($C_{11}$–$C_{14}$), 2% of $(NH_4)_2SO_4$, 0.1% of $K_2HPO_4$, 0.1% of $KH_2PO_4$, 0.1% of $MgSO_4 \cdot 7H_2O$, 2% of $CaCO_3$, 1 mg./ml. of thiamine, 100 mg./l. of L-methionine and 1 ml./l. of a traceable elements solution (composition: 83 mg./l. of $Na_2B_4O_7 \cdot 10H_2O$, 37 mg./l. of $(NH_4)_6Mo_7O_{24} \cdot 4H_2O$, 970 mg./l. of $FeCl_3 \cdot 6H_3O$, 8.8 mg./l. of $ZnSO_4 \cdot 7H_2O$, 20 mg./l. of $CuSO_4 \cdot 5H_2O$ and 7.2 mg./l. of $MnCl_2 \cdot 4H_2O$) was used as a control. L-threonine and L-homoserine in different amounts as shown in Table 1 were respectively added to the control medium.

The amounts of L-serine produced using these media are shown in Table 1.

TABLE 1

| Amount of added L-threonine (mg./ml.): | Amount of L-serine produced (mg./ml.) |
|---|---|
| 10 | 5.2 |
| 5 | 5.0 |
| 1 | 3.1 |
| 0 (contrast) | 2.3 |
| 10 | 4.8 |
| 5 | 4.2 |
| 1 | 2.9 |
| 0 (contrast) | 2.3 |

This example shows that the presence of L-threonine and L-homoserine enhanced the production of L-serine, with a range of about 4 to 10 mg./ml. giving particularly good results.

EXAMPLE 2

As a seed culture, an L-serine-producing strain ATCC 21222 which belongs to *Brevibacterium ketoglutamicum* was used. It was cultured in a similar manner to that described in Example 1 except that 5% of sorbitol was substituted for n-alkane in the fermentation medium.

1.1 mg./ml. of L-serine was produced by using the control medium, while 3.6 mg./ml. of L-serine was produced in a medium to which 10 mg./ml. of L-threonine was added and 3.1 mg./ml. of L-serine was produced when 10 mg./ml. of L-homoserine was added to a medium.

EXAMPLE 3

The cultivation was carried out in a similar manner to that described in Example 1 by using an L-serine producing strain ATCC 21221 which belongs to *Corynebacterium hydrocarboclastus* as seed, when using the control medium having no L-threonine added, 2.1 mg./ml. of L-serine was produced. In contrast, the amounts of L-serine produced using media respectively added with 10 mg./ml. of L-threonine and with 10 mg./ml. of L-homoserine were 4.5 mg./ml. and 4.0 mg./ml., respectively.

EXAMPLE 4

L-serine producing strain ATCC 21586 (methionine requiring, and threonine analogue and α-amino-β-hydroxy-valeric acid resisting) which belongs to *Corynebacterium glutamicum* was used as a seed. The seed strain was inoculated to 20 ml. of a sterilized culture medium (pH: 7.4) in a 250 ml. Erlenmeyer flask. The medium was composed of 2% glucose, 1% of peptone, 1% of yeast extract and 0.3% of NaCl. The seed was cultured at 30° C. for 24 hours with shaking, and the resultant seed culture (1 ml.) was then inoculated into 10 ml. of a sterilized fermentation medium in a large test tube. The seed was then further cultured at 30° C. for 96 hours with shaking. As the fermentation medium, a medium (pH: 7.4) having a composition of 10% of glucose, 2% of $(NH_4)_2SO_4$, 0.05% of $KH_2PO_4$, 0.05% of $K_2HPO_4$, 0.1% of $MgSO_4 \cdot 7H_2O$, 0.001% of $FeSO_4 \cdot 7H_2O$, 0.001% of $MnSO_4 \cdot 4H_2O$, 100 μg./ml. of biotin, 100 μg./ml. of L-methionine, and 2% of $CaCO_3$ was used as a control. L-threonine and L-homoserine in different amounts (as shown in Table 2) were respectively added to the control medium. The amount of L-serine produced using these media are shown in Table 2.

TABLE 2

| Amount of added L-threonine (mg./ml.): | Amount of L-serine produced (mg./ml.) |
|---|---|
| 10 | 10.0 |
| 5 | 8.2 |
| 0 | 6.0 |
| 10 | 8.9 |
| 5 | 7.5 |
| 0 | 6.0 |

Having described the present invention, that which is sought to be protected is set forth in the following claims.

We claim:

1. In a process for preparing L-serine by fermentation whereby L-serine is produced by cultivating a microorganism capable of producing L-serine in a medium containing carbon sources, nitrogen sources, and inorganic substances, and recovering the L-serine therefrom, the improvement which comprises adding at least one compound selected from the group consisting of L-threonine and L-homoserine to the medium at a total concentration of said compounds of more than 1 mg./ml. so as to enhance the yield of L-serine.

2. The process of claim 1, wherein 1 mg./ml. to 100 mg./ml. of said group is added to said culture medium.

3. The process of claim 1, wherein said microorganism is a bacterium selected from the genus group consisting of Arthrobacter, Brevibacterium or Corynebacterium.

4. The process of claim 1, wherein said culturing occurs at a pH of 4.0 to 9.5, and at temperature of 20 to 40° C.

5. The process of claim 1, wherein said microorganism belongs to the species *Arthrobacter paraffineus*.

6. The process according to claim 1, wherein said microorganism belongs to the species *Brevibacterium ketoglutamicum*.

7. The process according to claim 1, wherein said microorganism belongs to the species *Corynebacterium hydrocarboclastus*.

8. The process according to claim 1, wherein said microorganism belongs to the species *Corynebacterium glutamicum*.

9. A process for preparing L-serine which comprises culturing an L-serine-producing microorganism which belongs to genus selected from the group consisting of Arthrobacter, Brevibacterium and Corynebacterium in a culture medium containing at least one compound selected from the group consisting of L-threonine and L-homoserine in a concentration of more than 1 mg./ml., said medium further containing a carbon source, a nitrogen source and an inorganic substance, and recovering accumulated L-serine therefrom.

10. A process for preparing L-serine which comprises culturing an L-serine-producing microorganism which belongs to species selected from the group consisting of *Arthrobacter paraffineus, Brevibacterium ketoglutamicum, Corynebacterium hydrocarboclastus* and *Corynebacterium glutamicum* in a culture medium containing at least one compound selected from the group consisting of L-threonine and L-homoserine in a concentration of more than 1 mg./ml., said medium further containing a carbon source, a nitrogen source and an inorganic substance, and recovering accumulated L-serine therefrom.

11. A process of claim 10, wherein said microorganism is *Arthrobacter paraffineus* ATCC 21218.

12. A process of claim 10, wherein said microorganism is *Brevibacterium ketoglutamicum* ATCC 21222.

13. A process of claim 10, wherein said microorganism is *Corynebacterium hydrocarboclastus* ATCC 21221.

14. A process of claim 10, wherein said microorganism is *Corynebacterium glutamicum* ATCC 21586.

References Cited
UNITED STATES PATENTS 3,692,628   9/1972   Nakayama et al. ___ 195—28 R A. LOUIS MONACELL, Primary Examiner R. J. WARDEN, Assistant Examiner U.S. Cl. X.R.

195—28 R, 30